March 16, 1954    A. J. HORNFECK ET AL    2,672,598
TELEMETERING SYSTEM

Filed Dec. 14, 1950        6 Sheets-Sheet 1

INVENTORS
ANTHONY J. HORNFECK,
JOHN F. LUHRS
AND J. PEARSON SMITH
BY Raymond L. Jenkins
ATTORNEY INVENTORS
ANTHONY J. HORNFECK,
JOHN F. LUHRS
AND   J. PEARSON SMITH
BY
Raymond W. Junkins
ATTORNEY March 16, 1954  A. J. HORNFECK ET AL  2,672,598
TELEMETERING SYSTEM
Filed Dec. 14, 1950  6 Sheets-Sheet 5

INVENTORS
ANTHONY J. HORNFECK,
JOHN F. LUHRS
AND J. PEARSON SMITH
BY Raymond W. Junkins
ATTORNEY March 16, 1954     A. J. HORNFECK ET AL     2,672,598
TELEMETERING SYSTEM
Filed Dec. 14, 1950     6 Sheets-Sheet 6

|  |  | 0 | 200 / 30 | 400 / 60 | 600 psi / 90 amps. | 800 / 120 | 1000 / 150 |
|---|---|---|---|---|---|---|---|
| STATION NO. 1 | SUCTION PRESSURE | S S S S S | S S S S S | S X X X X | X X X X X | X X X X X |  |
|  | DISCHARGE PRESSURE | D D D D D | D D D D D | D D D D D | D D D D D | X X X X X |  |
|  | MOTOR AMPERES | A A A A A | A A A A A | A A X X X | X X X X X | X X X X X |  |
| STATION NO. 2 | SUCTION PRESSURE | S S S S S | S S S S S | S S S 2 2 | 2 2 2 2 2 | 2 2 2 2 2 |  |
|  | DISCHARGE PRESSURE | D D D D D | D D D D D | D D D D D | D D D D D | D 2 2 2 2 |  |
|  | MOTOR AMPERES | A A A A A | A A A A A | A A 2 2 2 | 2 2 2 2 2 | 2 2 2 2 2 |  |
| STATION NO. 3 | SUCTION PRESSURE | S S S S S | S S S S S | S S |  |  |  |
|  | DISCHARGE PRESSURE | D D D D D | D D D D D | D D D D D | D D D D D |  |  |
|  | MOTOR AMPERES | A A A A A | A A A A A |  |  |  |  |
| STATION NO. 4 | SUCTION PRESSURE | 4 4 4 4 4 | 4 4 4 4 4 | 4 S S S S | S S S S S | S S S S S |  |
|  | DISCHARGE PRESSURE | 4 4 4 4 4 | 4 4 4 4 4 | 4 4 4 4 4 | 4 4 4 4 D | D D D D D |  |
|  | MOTOR AMPERES | 4 4 4 4 4 | 4 4 4 4 4 | 4 4 4 4 A | A A A A A | A A A A A |  |

MEASURING CYCLE

PAPER MOVED ↑

| DATE | TIME |
|---|---|
| 5-9-50 | 10:01 AM |
| DIAL — (12) | |

INVENTORS
ANTHONY J. HORNFECK,
AND   JOHN F. LUHRS
J. PEARSON SMITH
BY Raymond W. Junkins
ATTORNEY Patented Mar. 16, 1954

2,672,598

UNITED STATES PATENT OFFICE 2,672,598

TELEMETERING SYSTEM

Anthony J. Hornfeck, Lyndhurst, Ohio, John F. Luhrs, Colonie, N. Y., and John Pearson Smith, Birmingham, Mich., assignors to Bailey Meter Company, a corporation of Delaware Application December 14, 1950, Serial No. 200,856

33 Claims. (Cl. 340—151)

Our invention relates to the long distance transmission of intelligence and particularly to the transmission of the instantaneous value of variable conditions, positions or the like. Such variables may be pressure, temperature, rate of flow, electrical values or the position of objects, etc. The invention is particularly useful in making available, at a central control point, information as to conditions existing at one or more remotely located stations where conditions may be changing.

As an example we have chosen to illustrate and describe our invention as applied to an oil product transportation system having a number of unattended pumping stations located apart and at a considerable distance from a control center. Pump suction pressure, pump discharge pressure and pump motor amperes, at any one of the stations, may substantially instantaneously be made known to the operator at the control center through a pulse communication system employing our invention.

Various types of pulse or time duration telemetering systems are known including Teletype and telegraph-type transmission. Electric pulses of very short but different duration are transmitted and received for the conveyance of intelligence and in which each letter of the alphabet, numerals and other significant characters may have an established and useful pulse length. The printing telegraph may transmit pulses of duration combinations similar to Morse or International Code. Known Teletype systems assign to each letter or other character one of the possible combinations of "pulse and blank" in a group of five repeated cyclically.

The receiver of a Teletype system may have a typewriter-like mechanism whereby letters or symbols are printed on a movable sheet of record paper in correspondence with the pulses successively received. Thus, by the transmission of a series of pulses, each (or each group) representative of a letter, number, or symbol, a message or similar intelligence may appear on the receiving record sheet in readable form. Pulse length discriminators in such a receiver are known and form no part of the present invention.

We have provided a novel system wherein the actual value of a variable condition or position may substantially instantaneously be made available for observation or use at a remote location.

A principal object of our present invention is to provide method and means for remotely ascertaining the value of a variable condition or position by pulse duration means.

Another object is to provide a selective telemetering system over great distances by a telephone wire pair.

Still a further object is to be able, at a central control location, to obtain visual intelligence of existing conditions at remote points selectively at will.

Another object is to produce at a remote location a typed or inscribed record of variable conditions such as pressure, flow, or the like.

The drawings depict in somewhat diagrammatic fashion an actual installation in connection with an oil pipe line in the United States.

Fig. 5 is a representative receiver record in the control station of Fig. 1.

Fig. 6 represents a time stamp which may be used with Fig. 5.

Figure 1:
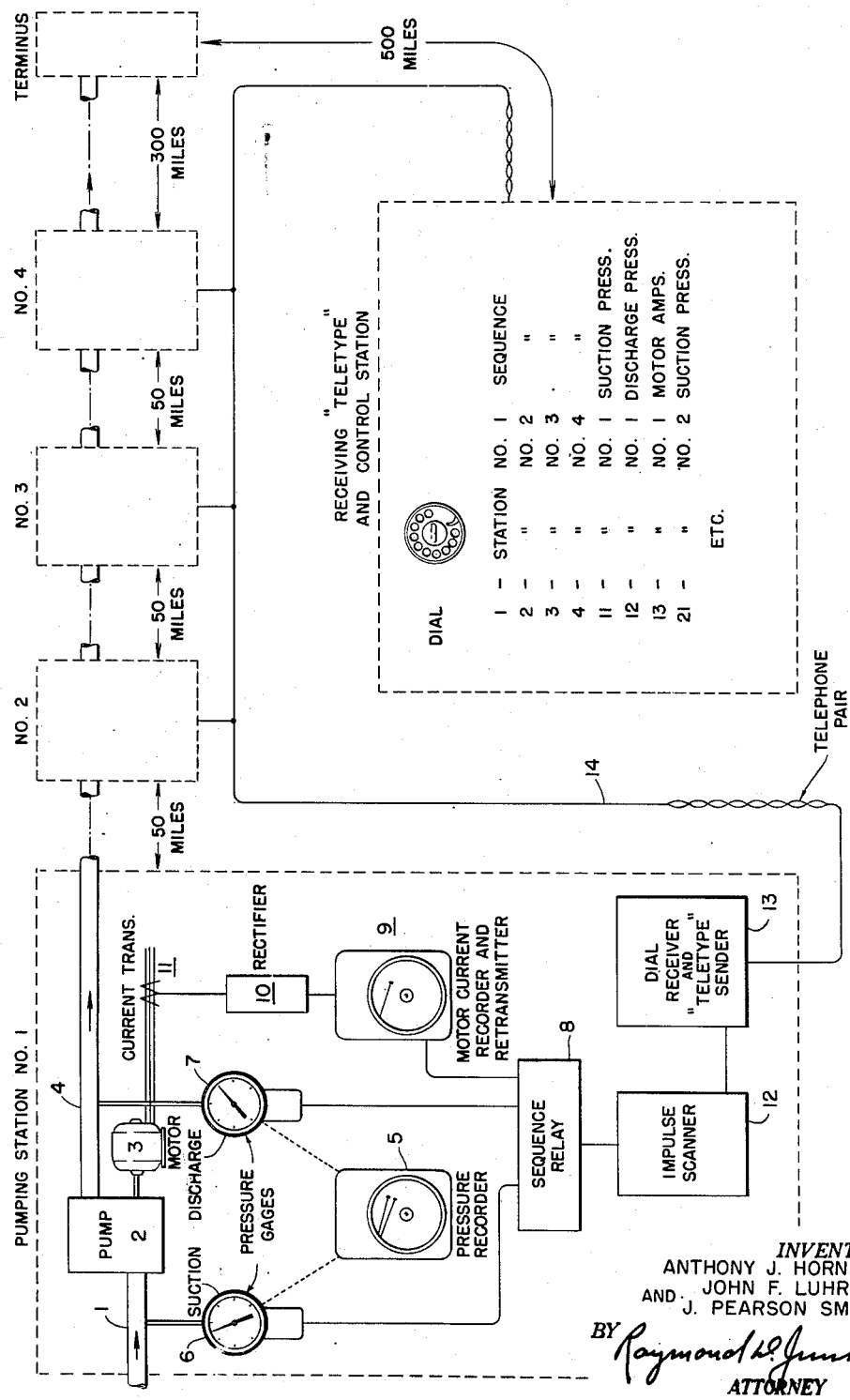
Fig. 1 is a block diagram of an oil pipe line to which our invention has been applied.

The pipe line system of Fig. 1 includes in diagrammatic block form:

Pumping Station No. 1
Pumping Station No. 2
Pumping Station No. 3
Pumping Station No. 4
Terminus as well as a receiving "Teletype" and control station.

Preferably the four pumping stations are unattended. The pipe line in which they are located may contain other stations such as feed, draw-off, transfer or the like between the source and the terminus. Our present invention is concerned with the unattended pumping stations designated numbers 1, 2, 3 and 4 and which are spaced approximately 50 miles apart on the pipe line system. Station No. 4 is about 300 miles from the terminus of the line and the terminus is about 500 miles from the receiving "Teletype" control station in New York city. A leased pair of telephone wires connects the control station with the four pumping stations making the control station approximately 950 miles from the furthest unattended pumping station.

Fig. 1 shows in block diagram the pertinent equipment with which we are concerned in Pumping Station No. 1. The equipment of Stations 2, 3 and 4 may be similar.

Considering Pumping Station No. 1 we designate an 8″ high pressure oil product pipe line at 1 as entering a pump 2 driven by a motor 3. Discharge of the pump 2 feeds the pipe line 4 to Station No. 2.

Within the station we provide a pressure recorder 5 making a continuous record of pump suction pressure by the pressure responsive gage 6 and pump discharge pressure by the gage 7. Gages 6 and 7 not only actuate the continuous recorder 5 but initiate transmission values representative of pressure values to a sequence relay 8 which will be explained later.

Current taken by the motor 3 is recorded at a recorder 9 supplied through a rectifier 10 by a current transformer 11. The recorder 9 is also connected to the sequence relay 8 and the latter is connected through an impulse scanner 12 to a dial receiver and "Teletype" sender 13 joined by a telephone pair 14 with similar equipment in Stations Nos. 2, 3 and 4 as well as with the control stations.

The four pumping stations may each be provided with the sender of a Teletype system and with the receiver of a dial selector. The control station is provided with a dial sender and with a Teletype receiver. In general the system provides that by dialing a numeral or character in the control station the desired intelligence from one of the pumping stations will substantially instantaneously appear on the Teletype receiver in the control station even though the various pumping stations are unattended. Thus an operator at the control station may, by dial, be immediately advised of variable condition values at the various pumping stations along the pipe line and through the use of such intelligence may properly control admission and draw-off to the pipe line as well as other operations in connection with the system.

Although not so limited, the present system being described is arranged, when initiated by proper dialing, to record on the receiving Teletype the following information repeated over and over for so long as the dialed circuit is not interrupted at the control station.

| Dial | Transmit |
| --- | --- |
| 1 | Station No. 1 sequence: Suction pressure. Discharge pressure. Motor amperes. |
| 2 | Station No. 2 sequence: Suction pressure. Discharge pressure. Motor amperes. |
| 3 | Station No. 3 sequence: Suction pressure. Discharge pressure. Motor amperes. |
| 4 | Station No. 4 sequence: Suction pressure. Discharge pressure. Motor amperes. |
| 11 | Station No. 1—Suction pressure. |
| 12 | Station No. 1—Discharge pressure. |
| 13 | Station No. 1—Motor amperes. |
| 21 | Station No. 2—Suction pressure. |
| 22 | Station No. 2—Discharge pressure. |
| 23 | Station No. 2—Motor amperes. |
| 31 | Station No. 3—Suction pressure. |
| 32 | Station No. 3—Discharge pressure. |
| 33 | Station No. 3—Motor amperes. |
| 41 | Station No. 4—Suction pressure. |
| 42 | Station No. 4—Discharge pressure. |
| 43 | Station No. 4—Motor amperes. |

As will be seen from the above, and as will be explained hereinafter, the operator at the control station may at any time dial the proper numeral and receive on his Teletype receiver the information coded to that dial number and such information will be repeated over and over again until the operator breaks the dial circuit preparatory to stopping the Teletype transmission and resetting for subsequent dialing. Inasmuch as the time required to dial a numeral and have the desired intelligence appear in printing at the control station is a matter of seconds only, it will be understood that the operator may have substantially instantaneous advice as to operating conditions at one of the four pumping stations located from 800 to 950 miles away. Just what the operator does, following the receipt of such intelligence, by way of remote control of valves, signals, or the like forms no part of the present invention.

In general the present system being described is a time duration telemetering system wherein the measured variables are transmitted by being converted into time intervals in a definite predetermined sequence. The length of each time interval is an indication of the magnitude of the variable. The Teletype equipment converts the time intervals into signals which are transmitted to the central control station where they appear as a visual record.

Figure 2:
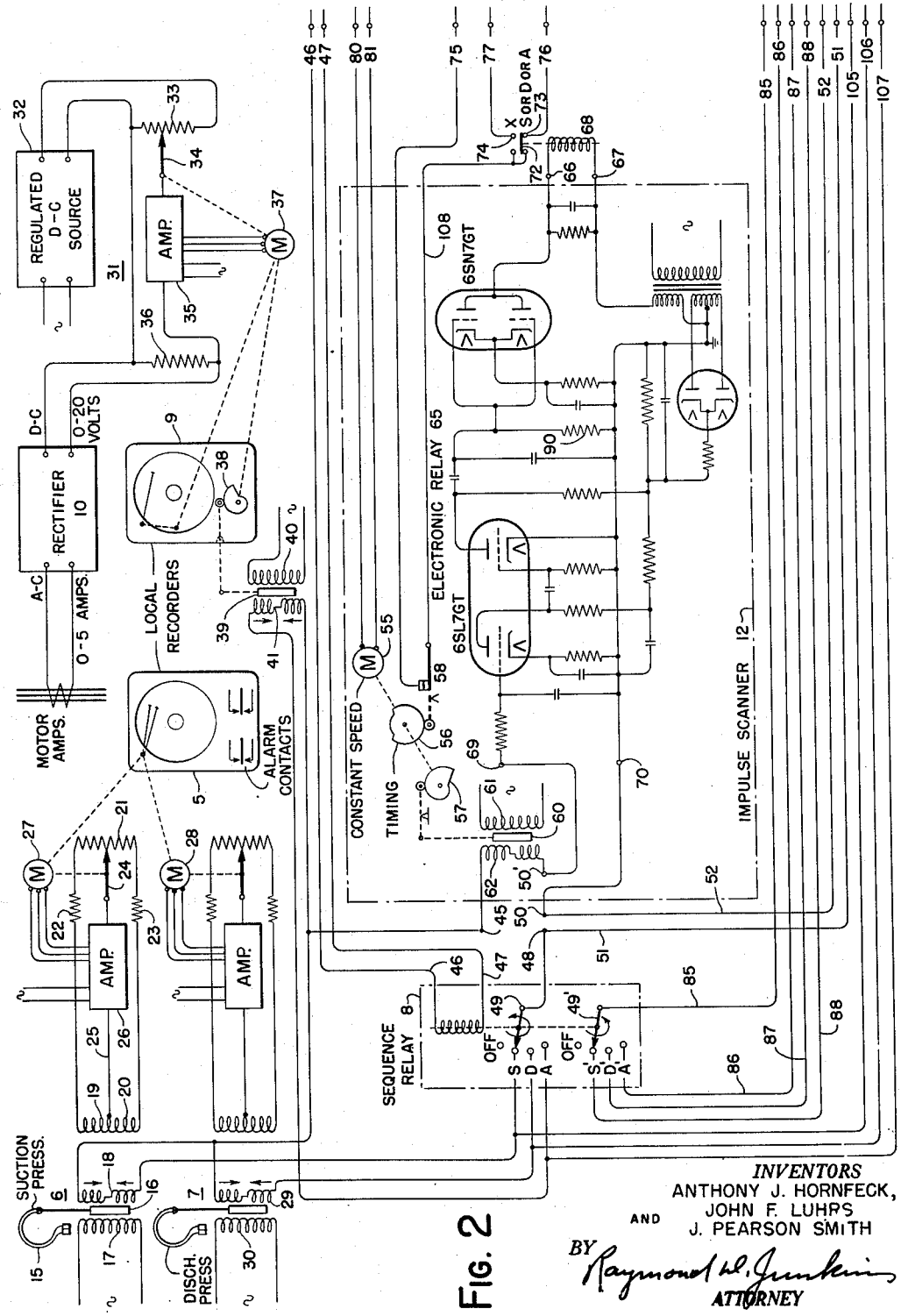
Figs. 2 and 2A show a circuit diagram in connection with one pumping station of Fig. 1.
Figure 2A:
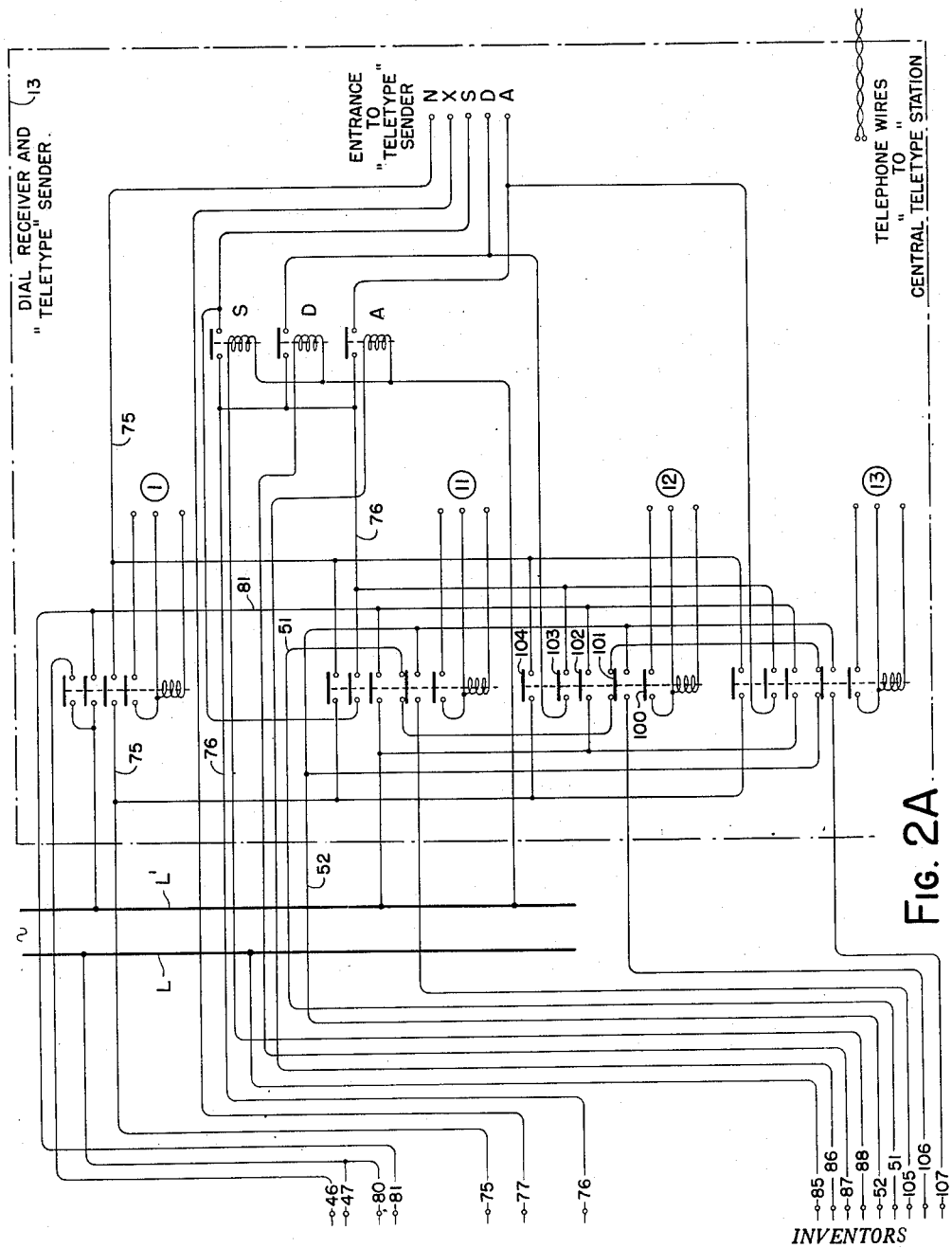

Referring now to Figs. 2 and 2A we show therein in somewhat diagrammatic fashion the circuits in connection with Pumping Station No. 1. The three variables under consideration namely, pump suction pressure, pump discharge pressure and motor amperes, are provided with transmitters having a A.-C. output voltages directly proportional to the measured variables. The impulse scanner is used to convert the A.-C. output voltages into time intervals. The length of the time intervals developed are directly proportional to the magnitude of the voltage output of the transmitters. Inasmuch as the voltage outputs are directly proportional to the measured variables, therefore the length of the time intervals are proportional to the magnitude of the measured variables.

For producing A.-C. voltages proportional to pump suction pressure and pump discharge pressure the pressure gages 6 and 7 are included in identical measuring circuits of which only that for gage 6 need be described.

A Bourdon tube 15 is sensitive to pressure within the pipe line 1 at the entrance to pump 2. Positioned by the Bourdon tube 15 is the core 16 of a movable core transformer having an A.-C. energized primary 17, a first pair of opposed secondaries 18 and a second pair of secondaries 19, 20. The secondaries 19, 20 are connected in series loop with a potentiometer 21 and calibrating resistances 22, 23. Positionable along the potentiometer 21 is a slide 24 which is connected by way of a conductor 25 with the mid connection of the secondaries 19, 20. Interposed in the conductor 25 is an amplifier and motor control arrangement 26 controlling the starting, stopping and reversing of a motor 27 which is arranged to position the balancing contact 24 and to simultaneously position one of the recording pens in the recorder 5.

The measuring circuit is a self-balancing network. Any unbalance between the voltages induced in the secondary windings 19, 20, across the divided portion of potentiometer 21, is manifest in the conductor 25 to act upon the amplifier 26 for control of the motor 27 to so position the slide 24 as to rebalance the circuit.

The amplifier and motor control circuit 26 is disclosed and claimed in an application of Anthony J. Hornfeck, Ser. No. 693,290, filed August 27, 1946, now Patent 2,544,790, issued March 13, 1951; while the movable core transformer having a plurality of pairs of secondary windings is disclosed and claimed in the application of Anthony J. Hornfeck, Ser. No. 3,666, filed January 22, 1948, now Patent 2,564,221, issued August 14, 1951.

In similar manner the discharge pressure gage 7 has a balancing motor 28 arranged to position the discharge pressure recording pen on the recorder 5. Gage 7 also has a pair of secondaries 29 in which is continually induced, from the primary 30, a voltage representative of the value of pump discharge pressure.

For continuously establishing a voltage representative of pump motor amps. we provide the rectifier 10 having an input range of 0–5 amps. A. C. and an output range of 0–20 volts D. C. providing an input to a network 31 wherein the variable in the range 0–20 volts D. C. is compared to the output of a regulated D.-C. source 32 across a potentiometer 33 having a slide 34. An amplifier motor control circuit 35 joins the slide 34 with one end of a resistor 36 and the amplifier is sensitive to unbalance of the network 31. If the D.-C. volts output of the rectifier 10 (representative of motor load) balances that portion of the regulated D.-C. source effective across the potentiometer 33 then the network is in balance and the motor 37 is stationary. If the pump motor load varies, thus changing the applied D.-C. volts across resistance 36, the amplifier 35, sensitive to such unbalance, causes the motor 37 to rotate in proper direction and extent to move the slider 34 along the potentiometer 33 to rebalance the network and simultaneously move the pen of recorder 9 to record the new value of pump motor load in amperes. At the same time motor 37 positions a cam 38 continuously positioning a core 39 coupling an energized primary 40 with secondaries 41. The circuit including elements 33, 34, 35, 36 and 37 is disclosed and claimed in an application of Anthony J. Hornfeck, Ser. No. 53,448, filed October 8, 1948, now Patent 2,594,436, issued April 29, 1952.

It will thus be seen that we provide for inducing a voltage in the secondaries 18 continuously representative of pump suction pressure, a voltage in the secondaries 29 continuously representative of pump discharge pressure, and a voltage in secondaries 41 continuously representative of motor load in amperes. These three variables are the ones desirably to be visually manifested in the central control station under the dial will of the operator there. We have converted the variables pump suction pressure, pump discharge pressure, and motor amps. into terms of A.-C. voltages within a uniform range, preferably 0–20 volts. The proportion of the range 0–20 volts A. C. at any instant in the secondary 18 or 29 or 41 is representative of the actual value of the variable as expressed in A.-C. voltage.

As mentioned in connection with Fig. 1 we have arranged that by dialing the numeral (1) the control station will receive a repeating sequence until the circuit is broken. The sequence is, pump suction pressure, pump discharge pressure and pump motor amps., and then repeating until the circuit is disconnected by the operator. It is thus apparent that we must explain how these three variables are sequentially transmitted from Station No. 1, keeping in mind our explanation of establishing for each of the variables an A.-C. voltage representative of the value of the variable.

One terminal in each of the secondaries 18, 29 and 41 is connected to common terminal 45. The other terminal of the secondary 18 joins a terminal S, from secondary 29 a terminal D, and from secondary 41 a terminal A; of the sequence relay 8. The sequence relay 8 may be of a motor driven or notching type having conductors 46, 47 which when energized move it through the desired sequence to an "off" or starting position and repeat the operation so long as the conductors 46, 47 are energized. In diagrammatic fashion we have shown that a contact arm 49, connected to a terminal 48, is adapted to sequentially engage the contacts S, D and A, returning to starting position "off." Preferably the arrangement is such that the arm 49 may dwell on each of the contacts a desired period of time with also a prearranged length of time between contacts and to return to the starting or "off" position.

It will now be apparent that, when the conductors 46, 47 are energized, the sequence relay 8 will provide at the terminals 45, 48 the measuring voltage induced in the secondary 18, then the measuring voltage induced in the secondary 29, and finally the measuring voltage induced in the secondary 41; whereafter the arm 49 will be returned to the "off" position without contacting the terminals A, D, S in its return travel. Thus, for a predetermined length of time the measuring values (represented by A.-C. voltages) are sequentially applied to the terminals 45, 48.

Mechanically positioned with the arm 49 is an arm 49' in similar manner sequentially engaging the contacts S', D' and A' for a purpose to be later explained.

If the circuit is traced from the terminal 48 it will be seen that (Fig. 2A) terminal 48 is connected to terminal 50, by way of conductors 51, 52 through closed contacts on relays (11) (12) (13). Thus, for the present, we may consider that the terminals 45, 50 are the input terminals to the impulse scanner 12 from the variable condition transmitters 6, 7 and 9. We will now describe the functioning of the impulse scanner 12.

The purpose of the impulse scanner is to compare the measuring voltage with a scanning voltage linearly increasing from zero to a predetermined maximum value. During the scanning or comparing operation an unbalance between the two voltages exists, of one direction and decreasing value until the linearly increasing comparison voltage equals the measuring voltage at which time the network is balanced. As the comparison voltage continues to increase, the unbalance reverses and increases in value to a maximum. The unbalance voltage (algebraic sum of the measuring and scanning voltages) is of one phase or the other across the balance point and is applied to a phase sensitive electronic relay for opening or closing a magnetic relay. Thus, during a given time interval, the relay is energized for that portion of the time interval preceding balance and is deenergized for that portion of the time interval following balance (or vice versa).

Figure 4:
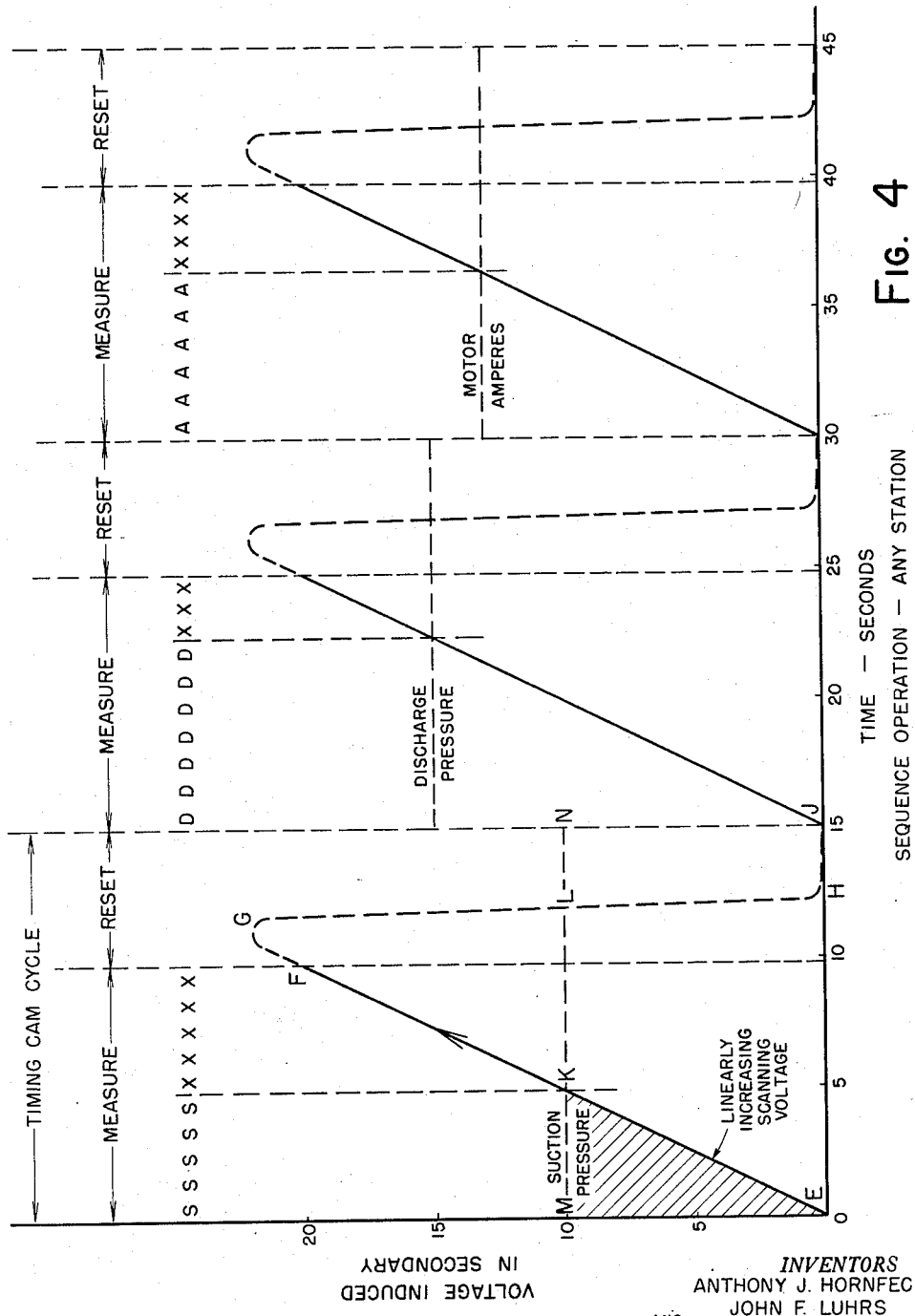
Fig. 4 is a graph of sequence transmission from a pumping station of Fig. 1.

Referring temporarily to Fig. 4 it will be observed that the suction pressure measuring voltage is indicated as 10 volts in the first timing cam cycle of 15 seconds' duration. Assume for the moment that this remains constant at 10 volts throughout the 15 seconds' timing cam cycle indicated. The line EKF represents the linearly increasing voltage of the scanning mechanism from zero to a maximum of 20 volts. We indicate line that a balance between the two voltages is reached at the cross-over point K of the voltage line EKF and the voltage line "suction pressure" which occurs at approximately 5 seconds after the beginning of the timing cam cycle. Thus, during the first 5 seconds of the timing cam cycle there is an unbalance in the direction of measuring voltage predominating (by the shaded portion EMK), starting at 10 volts and gradually decreasing to zero or balance condition at the end of 5 seconds (at K). As the voltage line EKF crosses the voltage line suction pressure the direction of unbalance reverses and the amount of unbalance uniformly increases from zero at K to 10 volts at F.

It is apparent that, during any predetermined period of time for linear increase in scanning voltage, the proportion of the unbalance of one phase to the unbalance of the other phase will give an indication of the location of the balance point (in time) between the beginning E and end F of the "measure" portion of the time cycle.

Referring now again to Fig. 2 we provide at 55 a constant speed motor arranged to mechanically drive a timing cam 56 and a measuring cam 57. Preferably the cams 56, 57 make one complete revolution in 15 seconds of which the measuring portion is 9.79 seconds and the reset portion 5.21 seconds (see Fig. 4). In the present instance this is arrived at as follows. The counting rate set by Teletype equipment is 368 characters per minute. Each of the three variables being measured is arbitrarily calibrated to have a maximum of 60 characters. Thus, 60 characters × 60 seconds in a minute ÷ 368 = 9.79 seconds (out of the 15 second total cycle) for the maximum transmittal of 60 characters representing maximum expected value of the variable condition.

The operation of the timing cam 56 is to actuate an electric switch 58 to break the 15 second cycle into a measuring portion of 9.79 seconds and a reset portion of 5.21 seconds. As shown in Fig. 2 the contact 58 is closed representing the measuring portion of the cycle.

The scanning or measuring cam 57 performs the function of reciprocating a movable core 60 relative to an energized primary 61 and a pair of opposed secondaries 62 similar to the measuring transformers 6, 7 and 9. As the core 60 is reciprocated between the windings 61, 62 it will be evident that a voltage will be induced in the secondaries 62 determined by the coupling position of the core in the windings. The voltage so induced in the secondaries 62 is the scanning voltage previously referred to for comparison with the selected measuring voltage available at 45, 50. Thus, depending upon the position of the sequence relay 8, the scanning circuit includes in series loop (Fig. 2) the secondaries 18 across the terminals 45, 50 and the secondaries 62 across the same terminals. We show, however, that the conductor connection between the secondaries 62 and the terminal 50 is broken to include a phase sensitive electronic relay 65 having output terminals 66, 67 across which is connected the winding 68 of a magnetic relay previously mentioned. It will thus be apparent that the unbalance voltage developed as the algebraic sum of the measuring voltage and the scanning voltage will appear at the terminals 69, 70 as an input for the electronic relay 65 which is phase sensitive, paying no attention to the magnitude of the unbalance but only as to the direction of unbalance. The output terminals 66, 67 will thus provide, during each timing cam cycle of 15 seconds, an amplified voltage for a length of time determined by the value of the variable (with 9.79 seconds as a maximum) during engagement of the sequence relay contact arm 49 with either the terminal S or D or A; and no voltage for the remainder of the 15 second cycle. Amplified unbalance voltage at the terminals 66, 67 energizes the relay 68 to the position shown wherein the contact 72 closes with a terminal 73 for a time length representative of the measured value of suction pressure (S), discharge pressure (D), or motor amps (A). When no voltage appears at the terminals 66, 67 and the relay 68 is deenergized, the contact 72 engages the terminal 74 to indicate the remainder of the time cycle.

It will thus be seen that the system so far described provides that out of a time portion of 15 seconds the measured variable manifests a closing of circuit between conductors 75, 76 for a portion of the 15 seconds up to a maximum of 9.79 seconds. If the measured variable is less than maximum value the circuit is closed between conductors 75, 77 for a proportionate part of the 9.79 seconds.

The electronic relay 65 receives the voltage difference at input terminals 69, 70 with a 6SL7GT tube which serves as a two-stage amplifier. A 6SN7GT tube acts as a phase sensitive device controlling the magnetic relay 68. The unit is sensitive to even a very small voltage difference since said difference is amplified through the two stages of the 6SL7GT tube approximately 2500 times. The output voltage of the 6SL7GT tube is applied across resistor 90 and the grids of the type 6SN7GT tube. The latter may be considered as a single section triode since, in this case, both halves are connected in parallel for greater current capacity.

As long the the voltage of the scanning secondaries 62 is increasing along the line EKF (Fig. 4) to match that of the measuring secondaries, the grid voltage of the 6SN7GT tube is in phase with that of the anode, and the plate current will be sufficient to keep relay 68 energized. However, when the voltage difference drops to zero and reverses phase (as point K is passed), the grid of the 6SN7GT tube is out of phase, the plate current is cut off, and relay 68 is deenergized.

Interposed in conductor 75 is the switch 58 which definitely limits (irrespective of closure 72—73 or 72—74) signal appearance at 75, 76 or 77 to the measuring portion 9.79 seconds of the cycle.

Referring again to Fig. 4 it will be seen that the first timing cam cycle of 15 seconds' duration is broken by the timing cam 56 and contact 58 into a measuring portion of 9.79 seconds and reset portion of 5.21 seconds. The voltage induced in the secondaries 62 follows generally the path EKFGLHJ while the voltage generated by the secondaries 18 follows the path MKLN.

It will be observed that the voltage pattern MKLN is available at terminals 45, 50 throughout that portion of the 15 second cycle that arm 49 engages S. The voltage pattern EKFGLHJ is available at terminals 45, 50' throughout the 15 second cycle or one parallel to it. The amplified unbalance, if any, is available at terminals 66, 67 for the entire 15 seconds. The relay 68 is energized, and 72, 73 closed, during the time 0–5 seconds, and for the period of time from about 11.8 to 15 seconds as the scanning voltage follows the path LHJ. The relay 68 is deenergized and 72, 74 closed during the time span 5 to 11.8 seconds.

Through the operation of cam 56 on contact 58, however, the effectiveness of the relay action at terminals 75, 76 is limited to the span 0–5 seconds while the effectiveness of the relay at terminals 75, 77 is limited to the span 5–9.79 seconds. In other words, as clearly seen in Fig. 4, the timing cam 56 allows only the portion EKF of the voltage induced in secondary 62 to be effective.

Figure 3:
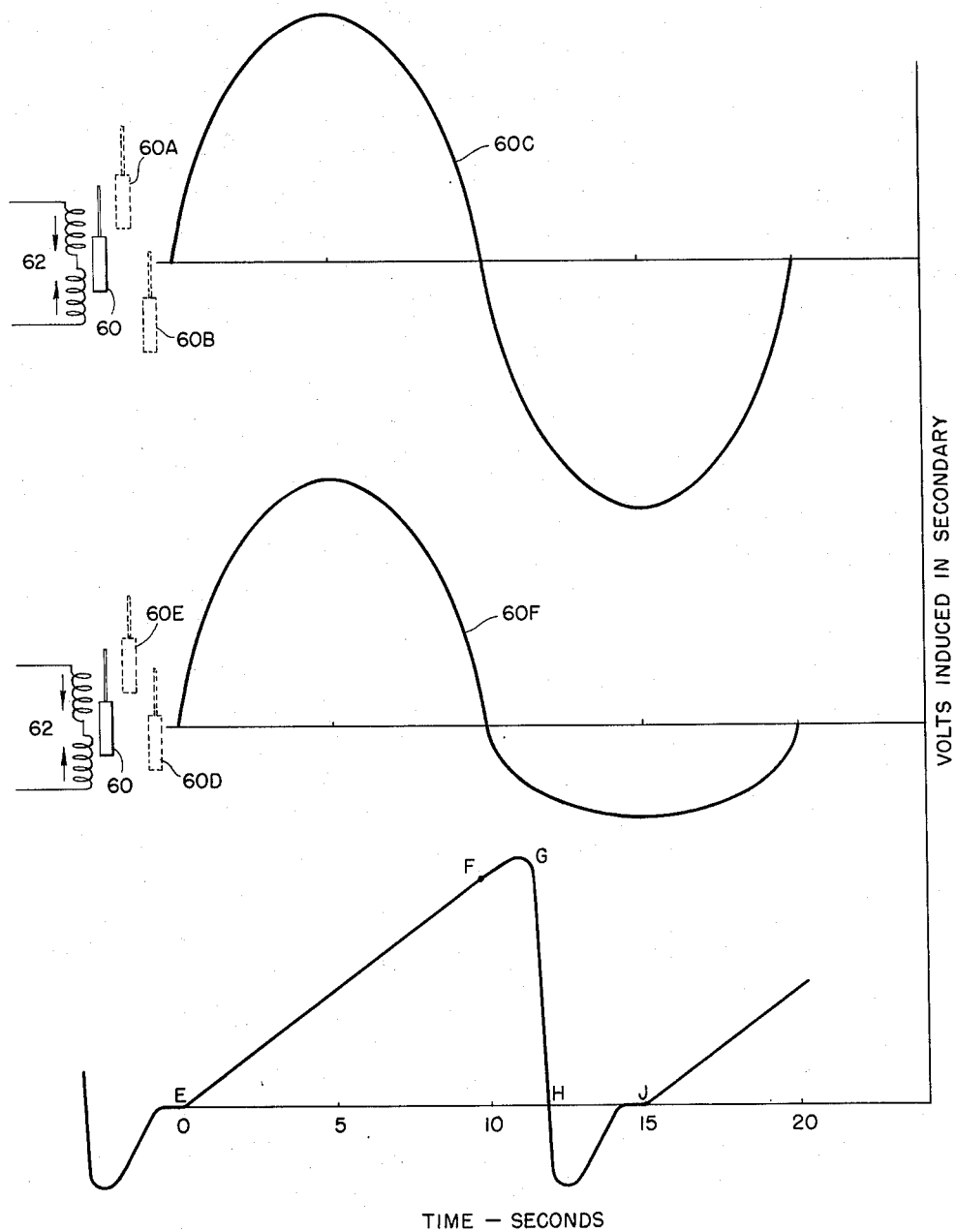
Fig. 3 is a graph of voltage values of an impulse scanner.

Referring to Fig. 3 we will now explain how we obtain the comparison voltage curve shape EKFGLHJ of Fig. 4. Fig. 3 shows in the upper graph the movable core 60 at an electrical neutral location between the primary 61 and the secondaries 62. Smooth reciprocation of core 60 to a maximum position 60A and minimum position 60B develops a sinusoidal curve 60C of voltage induced in the secondaries 62. The voltage scale is arbitrary while the time scale is shown at 20 seconds for a complete voltage cycle.

In the middle graph of Fig. 3 we show that the cam 57, while still making one revolution in 20 seconds, has been distorted in its positioning of the core 60 so that the core is reciprocated between the position 60D and 60E to produce the voltage curve 60F having in the one half-cycle a greater area above the zero voltage line than the other half-cycle area is below said zero voltage line. In other words, the induced voltage in the secondary 62 would be substantially all of one phase with a sinusoidal increase from zero to a maximum and decay again to zero in one half-cycle.

The lowermost graph of Fig. 3 depicts arrival at the desired result in shaping the cam 57 to obtain the voltage form of Fig. 4. The measuring portion of the cam, as selected by switch 58, is shaped for linear increase in voltage from zero (E) to a desired maximum (F) and with an induced voltage carry-over FGHJ which is insulated from terminals 75, 76, 77 by opening the switch 58 but is necessary in mechanical cam design and construction to obtain smooth motion characteristics of the mechanism. We have also, in this graph, completed the cycle in 15 seconds as desired.

It will be seen that the comparison or scanning voltage, induced in secondaries 62 through the coupling action of core 60, may be arranged to provide a pattern of gradual increase (or decrease) over the measuring portion of the timing cam 56, or may be arranged to provide any characterized pattern, through adjustment of the shape and time of rotation of cam 57.

We have provided at the "dial receiver-Teletype sender" 13 the conductors 75, 76 which may provide a measuring voltage representative of one phase or by way of conductors 75, 77 a voltage representative of opposite phase if any. During a predetermined time interval of 15 seconds the maximum measuring signal may be for 9.79 seconds while the opposite signal is zero seconds or the 9.79 second time interval may be split between the two signals. The measuring signal may be selectively representative of S or D or A and the percentage length of the measuring signal in time (out of a maximum of 9.79 seconds) is representative of the percentage of the maximum scale of the measuring device 6 or 7 or 9. In other words, if the device 6 has a range of 0–600 p. s. i. g. and the actual suction pressure is 400 p. s. i. g. then the measuring signal appearing across conductors 75, 76 will be $400/600 \times 9.79 = 6.52$ seconds. Thus we provides as an input to the "dial receiver-Teletype sender" a voltage across 75, 76 of a time length representative of or proportional to the instantaneous value of the measured variable.

The device 13, at Station No. 1, is also a receiver for the digital dial at the remote control station. Either relay (1), (11), (12) or (13) is selectively energized by the remote dialing. Each of these four relays is of a hold-in type which remains energized, following the dialing thereof, until the circuit is broken at the control station. This is similar to the ordinary dial telephone system wherein the circuit remains completed until the receiver is replaced.

The remote station 13 includes the sender of a Teletype system arranged to transmit to the Teletype receiver at the control station a series of letters or characters by pulses representative of one phase or the other (at terminals 69, 70). As depicted in Fig. 4 the measuring time may comprise a transmittal of the letter S (pump suction pressure), the letter D (pump discharge pressure), the letter A (motor amps.), and for the remaining portion of the "measure" time may transmit the letter X. We have shown in Fig. 2 terminals labelled respectively N, X, S, D and A at the entrance to the Teletype sender. These represent the input to the Teletype sender for transmitting selectively letters X, S, D or A. Relays (S) (D) and (A) are provided for channelling the measuring signal from 72—73 to the proper Teletype input terminal S or D or A. When 72—73 is closed, the conductors 75, 76 connect across NS or ND or NA for a length of time (9.79 seconds or a portion thereof) determined in part by contact 58. For the remainder (if any) of the 9.79 seconds 72—74 is closed and conductors 75, 77 connect across NX. Thus, the signal transmitted by the Teletype sender is a combination of S or D or A characters and X characters, the number of the S or D or A characters relative to the total being an indication of the value of the variable being measured.

*Dial 1*

At Pumping Station 1 relay (1) is energized and holds itself in. This initiates a sequential transmittal to the central control station of:

Station No. 1—pump suction pressure.
Station No. 1—pump discharge pressure.
Station No. 1—motor amperes.

NOTE.—This sequence will be repeated until circuit is disconnected at the control station.

Energizing of relay (1) connects the constant speed motor 55, by way of conductors 80, 81 to power lines L, L'. Simultaneously the sequence relay 8 is started by connecting conductors 46, 47 across the power lines L, L'. The cams 56, 57 and the relay 8 have previously been adjusted for coincidence in operation and, as they are connected to the same power source, will stay in proper relationship. They may, in fact be all driven by motor 55 through proper gear reduction.

Contact arm 49 engages the terminal S of relay 8 making effective the secondaries 18 for comparison with the scanning secondary 62 voltage. Rotation of cam 57 moves the core 60, inducing a voltage in the secondary 62. During the measuring portion of timing cam 56, namely 9.79 seconds out of the complete cycle of 15 seconds, the terminals 75, 76 are connected (by way of 58) for a measuring signal representative in time length of the value of suction pressure. That the signal leaving 13 is representative of S (rather than D or A) is due to the fact that arm 49' is engaging contact S' in relay 8. Such an engagement connects the contact 49' by way of conductor 85 with power line L and completes the circuit through contact S', conductor 88 and relay coil (S) to the power line L' thus energizing relay (S) thereby insuring that the signal available at 75, 76 will be made available at the Teletype sender output terminals NS. It will be seen that conductor 75 is connected to terminal N by way of relay (1), conductor 77 leads directly to terminal X, and conductor 76 reaches terminal S by way of relay (S).

Considering Fig. 4, at the dialing of the numeral (1) the motor 55 and relay 8 are placed in operation and for the succeeding 15 second time cycle of the cam the Teletype sender in device 13 transmits to the control station 30 S's followed by 30 X's in a total of 9.79 seconds, followed by an idle time of 5.21 seconds. At the end of 15 seconds the cams 56, 57 are at their starting positions and relay 8 has switched to the D and D' positions. The operation repeats, transmitting the letter D representative of discharge pressure. At the end of the second 15 seconds the cams 56, 57 are again at their starting positions and relay 8 engages A and A' whereupon a series of A's is transmitted representative of the measured value of motor amperes.

So long as dial (1) is operative this sequence will be repeated. A time dwell of one cycle (15 seconds) will be had between transmitting A and again transmitting the value S. After the third cycle is completed, the relay 8 is at "off" and the succeeding 15 second cycle is idle of signals until relay 8 is moved to position S. Whenever it is desired to cease the sequence transmission the operator at the Control Station breaks circuit to relay (1) and the system is non-transmitting until again dialed.

*Dial 2 or 3 or 4*

The measured values of pump suction pressure (S), pump discharge pressure (D), and motor amps (A), for Station No. 2 or No. 3 or No. 4 are sequentially transmitted in similar fashion.

*Dial 12*

This number is arbitrarily selected as representative of dial signals 11, 12, 13, etc.

With this selection it is desired only to receive the value of Station No. 1 pump discharge pressure and sequence relay 8 is not used. When the numeral (12) is dialed at the central control station the relay (12) (Fig. 2A) is energized and holds in through contact 100. Contact 101 opens the circuit between terminals 48, 50 by disconnecting conductors 51, 52; and closes circuit 52, 106 thus by-passing the sequence relay 8 to join secondaries 29 directly to terminal 50. Thus, secondaries 29 are connected to terminals 45, 50 in a network including secondaries 62. The unbalance of the network, appearing at terminals 50, 50', constitutes the input to electronic relay 65 at input terminals 69, 70; the output of relay 65 controlling the time portion of the measuring cycle of cam 56 during which relay contact 72 engages terminal 73.

Energization of relay (12) also causes contact 102 to complete the circuit of motor conductor 81 to L', the other motor conductor 80 being permanently connected to power source L. Thus the timing motor 55 is energized for controlling switch 58 and for reciprocating comparison core 60.

Comparing the voltage of secondaries 29 with that induced in secondaries 62 results in connecting conductor 108 with conductor 76 for a portion of the measuring time cycle of cam 56 and in connecting conductor 108 with conductor 77 for the remaining portion of the measuring time cycle of cam 56. But, the time portion during which 108, 76 is closed does not distinguish as to whether the measuring signal should be S or D or A. This is accomplished by closure of contact 103 of relay (12) which connects conductor 76 to Teletype input D, by-passing relay D. At the same time closure of contact 104 connects conductor 75 with Teletype input N.

When relay 68 closes 108, 77 the signal X is available at Teletype input through relay contact 104 to N and conductor 77 directly connected to X.

So long as relay (12) is held in by contact 100 the Teletype will cyclically transmit a series of D's and a series of X's followed by an idle time (reset portion of cam 56); the time ratio of the transmitted D's to the X's providing a measure of the pump discharge pressure. Thus, if D is transmitted throughout the entire "measure" portion of timing cam cycle it means that the pump discharge pressure is at maximum calibrated value, while if the time of D transmission is just equal to time of X transmission it signifies that pump discharge pressure has a value 50% of calibrated maximum.

*Other dialing*

In similar manner, dialing (22), (32) or (42) transmits pump discharge pressure at Station No. 2 or No. 3 or No. 4. Dialing (11), (21), (31) or (41) transmits pump suction pressure, dialing (13), (23), (33) or (43) transmits motor amps.

*Teletype receiver*

At the control station Teletype receiver we preferably employ a tele-typewriter or teleprinter responsive to the signals S, D, A, X from the station dialed. Fig. 5 illustrates a record paper horizontally graduated with a range 0–1000 p. s. i. for pump suction or discharge pressure and with a range 0–150 amps. for pump motor amperes. The graduated range spans the time interval of the previously mentioned measuring cycle, the reset interval allowing the tele-typewriter to move the record paper upward and retract the carriage for starting a new record line of typed characters.

We have chosen to show in Fig. 5 several possible combinations of characters which may be used. For station No. 1 we transmit S and D and A for the measured values, and X for the remainder of the measuring cycle, as described for the transmitting station. The values for Station No. 1 are approximately Pump suction pressure_____p. s. i__ 440
Pump discharge pressure_____p. s. i__ 800
Pump motor amperes_____amps__ 72 it being appreciated that, in Fig. 5, we have shown each character S or D to have a value of 40 p. s. i. or a total of only 25 characters for the complete measuring cycle. It will be recalled that we have mentioned that actually our system is calibrated to transmit 60 characters during the 9.79 seconds' measuring portion of the timing cam 56. With a total of 60 characters for a range of 0-1000 p. s. i. each character will represent about 17 p. s. i. If closer reading is desired we may suppress the pressure gage 6 to a range of 200-600 and the pressure gage 7 to a range of 600-1000, for example.

Fig. 5, for Station No. 2, indicates that the record may be composed of S's followed by the numeral 2 designating the station from which the S is coming.

Fig. 5, for Station No. 3, shows that it is unnecessary to transmit any character other than S, D and A.

Fig. 5, for Station 4, shows the possibility of designating the station number preceding the designation of transmitted measurement.

Many other combinations of symbols or characters may, of course, be used. We show in Fig. 6 the possibility of an automatic time stamp which may be used in connection with the teletypewriter to record adjacent the received information the date, time and dial used, the latter designating the station and intelligence transmitted.

While we have chosen to illustrate and describe one preferred embodiment of our invention, it will be understood that this is by way of example only.

In place of using wires to transmit the intelligence signals, radio waves of any desired length may be used, such as in the normal transmitting bands, or short waves or micro-waves.

We may provide a teleprinter in each of the pumping stations, or at other locations additional to the central control station, so that a typed record of the transmitted intelligence may be available at numerous places. Furthermore, the system may be so arranged that a person entering one of the normally unattended pumping stations may dial (in the same maner as in the central control station) and obtain desired information according to the numeral dialed, from any of the stations. The system may actually provide that any one of the locations become a control station in multi-way communication with the other locations, through the provision of transmitting-receiving Teletype equipment.

While we have described a repetitive sequence of three variables in a dialed station, we may so arrange the system that having dialed (1) for example, the value of pump suction pressure, then pump discharge pressure, then pump motor amps. for Station No. 1 is sequentially transmitted to all receiving locations and then the transmittal stopped until again dialed, i. e. not repeated. Furthermore, we may so arrange the system that the sequence extends beyond the one station dialed. For example, if (1) is dialed it may initiate a sequence like S-P-A_____Station No. 1.
S-P-A_____Station No. 2.
S-P-A_____Station No. 3.
S-P-A_____Station No. 4.
S-P-A_____Station No. 1.

etc. until stopped.

It will therefore be appreciated that we do not wish to be limited to the embodiment which we have described in detail.

What we claim as new, and desire to secure by Letters Patent of the United States, is:

1. An electric telemetering system including in combination, means establishing a plurality of voltages within a fixed range each of which represents a variable, means establishing a cyclic linearly varying voltage at least of said range for comparison with the "variable" voltages, a comparison network for one of the "variable" voltages and the "cyclic" voltage, means to measure the time interval from the start of each cycle to the occurrence of balance, mechanism for selecting which of the "variable" voltages is to be placed in the comparison network, means for manually activating the selective mechanism from a remote receiving station, means for identifying the comparison network output with the "variable" voltage placed in the network, and means for simultaneously transmitting to said receiving station over a common media the comparison network time interval as measured and the identification.

2. An electric telemetering system including in combination, means establishing a cyclic voltage having a comparative portion with a linear variation, means establishing a measuring voltage continuously representative of a variable, a comparative network for the two voltages, a relay circuit selectively activated by the direction of unbalance in the network resulting from comparison of the voltages, a signal circuit actuated by the relay circuit for choice between the production of two output signals in accordance with the duration of each direction of unbalance, means for breaking the signal circuit to restrict its output to within a predetermined portion of the period of linear variation of the cyclic voltage, and means for transmission of the signal circuit output to a selected remote point.

3. The combination of claim 2 wherein the comparative portion of the cyclic voltage having linear time-magnitude variation is formed wholly within a single phase of the cyclic voltage.

4. An electric telemetering system including in combination, a plurality of measuring means each establishing a voltage continuously representative of a different variable to be transmitted, means establishing a single cyclically voltage linearly characterized during a predetermined portion of its cycle for comparison with any of the representative voltages, a comparison network for a selected one of the representative voltages with the comparative voltage, a sequence mechanism introducing the voltages established by the plurality of measuring means into the comparison network in selected order, means to measure the time interval between the beginning of each cycle and balance, and means controlled by the comparison network identifying its output with the variable voltage selected and transmitting the identified signal to a predetermined location throughout said interval.

5. The combination of claim 4 wherein, the sequence mechanism includes a contact selectively activating relays which establish correspondence in identification between the output of the means controlled by the comparison network and that of the selected variable.

6. The combination of claim 4 wherein, the means for establishing the cyclic voltage includes a movable core transformer actuated by a shaped cam the means controlled by the comparison network additionally includes a signalling circuit controlled by the comparison network output in accordance with network unbalance, and by a contact actuated by a cam mechanically timed with the means establishing the single cyclic voltage.

7. The combination of claim 6 wherein the network output actuates a relay and means are provided for the relay to control the said signalling and an additional signalling circuit by alternating contact between two sets of output terminals upon direction change in comparison network unbalance, and the timing cam breaks both signaling circuits during the portion of its cycle the shaped cam is not varying the single cyclic voltage linearly.

8. An electric telemetering system including in combination; a first circuit including, means for selective inclusion of voltage establishing means each of which constantly represents variables to be transmitted, means for establishing a single cyclic voltage which increases linearly over a predetermined portion of its cycle; a phase sensitive relay responsive to the change in direction of unbalance between the two voltages compared in this first circuit; a second circuit including, a timed breaking means for opening the second circuit to define limits of linear increase periods of the cyclic voltage in the first circuit, and switching means controlled by the relay for dividing the second circuit output during the linear increase period of the cyclic voltage in accordance with the time each of the two directions of voltage unbalance continue in the first circuit; and means controlled by the selective means of the first circuit for routing the second circuit output to preselected transmitting terminals.

9. In combination, a balanceable electric first circuit including, a selected one of a plurality of means producing variable representing voltages, and a movable core transformer cycled by a cam means to produce a voltage which has a linear increase determined cycle portion; a switching circuit which assumes one of two positions upon the voltages of the first circuit unbalancing in one of two directions; an electric second circuit controlled by the switching means for activation of two sets of transmitting terminals in accordance with the ratio between the time periods the two unbalance conditions exist within the preselected portion of the linear increase cycle of the movable core transformer movement; a breaker for the second electric circuit geared to the movable core transformer cam for interruption of the second circuit for substantially that portion of non-linear voltage production by the movable core transformer; and a plurality of manually controlled relays which divide the output of the second circuit from its two sets of transmitting terminals between pairs of output terminals, one of each pair preselected to correspond to the variable then selected for measurement and the other of each pair being common to all pairs.

10. The combination of claim 9 wherein, means are provided for repeatedly including the selected one or any sequence of the plurality of means into the first circuit and obtaining the corresponding output for a determinable number of repetitions.

11. An electric telemetering system including in combination, means establishing a voltage continuously representative of the value of a variable, means cyclically establishing a comparison voltage having a linearly increasing value for a portion of each time cycle, a comparison network receiving said voltages, a relay responsive to direction of unbalance of said network and arranged to close one or the other of a pair of signal circuits depending upon the direction of unbalance, a switch in the neutral of said signal circuits, a constant speed timing motor, and a cam driven by the motor arranged to close said switch during the said portion of each time cycle only.

12. The combination of claim 11 including means under the control of said pair of signal circuits arranged to transmit repeatedly an intelligence character during that part of said time cycle portion that one of the pair of signal circuits is closed and to transmit repeatedly a different intelligence character during the remainder of said time cycle portion.

13. The combination of claim 12 including a teleprinter receiving said characters and visually recording the characters in sequence proportional within a predetermined total in consonance with the percentage of a maximum value of the variable which the actual value of the varable is at the instant when the relay changes the closure of one of the signal circuits to closure of the other.

14. The combination of claim 13 including a plurality of means each establishing a voltage continuously representative of the value of a different variable, and sequence means operated in synchronism with said cam for successively subjecting the "variable" voltage into the comparison network.

15. The combination of claim 14 including selective means in connection with the transmitting means providing an intelligence character representative of each variable for repetitive transmission during the one part of the time portion.

16. The combination of claim 15 including means assuring that the correct representative character is transmitted in accordance with the sequence means operation.

17. The combination of claim 16 including manual selection means arranged to start the motor and thus the sequence transmittal of the characters representative of the several variables.

18. The combination of claim 16 including manual selection means arranged to select for transmission the character representative of the value of the selected variable only.

19. The combination of claim 18 including relay means selecting the desired variable and its representative character for transmittal, and circuit means providing repeated transmittal of the selected variable character until other means are operated breaking the transmittal.

20. In an electric telemetering system, time cycle means dividing time into uniform units, mechanism transmitting during each time unit a succession of intelligence characters designating a variable, the number of characters transmitted during the unit being a measure of the value of the variable, and a receiving teleprinter making a visual record of the characters transmitted in relation to record graduation representing total number of characters which would correspond to maximum value of the variable.

21. The system of claim 20 in which the mechanism is adapted to transmit a different intelligence character representing each of a plurality of variables, and remote manual selector means arranged to initiate the transmittal of the selected variable.

22. The system of claim 21 including sequence means whose operation is initiated by said selector and adapted to sequentially impose the plurality of variables into transmission.

23. The system of claim 21 including radio wave transmission means for the characters to be transmitted, and radio wave receiving means actuating the said teleprinter.

24. The system of claim 21 including a plurality of separately located manual selector means any one of which will select the variable desirably to be transmitted.

25. The system of claim 24 including a plurality of transmitting stations each of which has at least one variable to be transmitted, a plurality of receiving stations all of which receive the transmitted characters, and manual selector means for selecting the station variable to be transmitted.

26. A pulse transmission system including an impulse scanner cyclically providing a comparison voltage having a linearly increasing portion, and measuring means of a variable providing a measuring voltage continuously representative of the value of the variable and within the voltage range of said portion.

27. The system of claim 26 including a network to which the two voltages are applied for comparison.

28. An electric telemetering system including in combination, measuring means establishing a voltage continuously representative of a variable to be transmitted, means establishing a cyclically varying comparison voltage having a portion with a linear variation throughout a range at least as great as that of the variable voltage, a comparison network receiving and combining said "variable" voltage and said "comparison" voltage in opposition, a relay responsive to direction of unbalance in said network closing a signalling circuit during preponderance of the "variable" voltage and means timed in unison with said voltage cycling means to open said signalling circuit during non-linear portions of the "comparison" voltage cycle.

29. The system defined in claim 28 in which said relay closes a second signalling circuit during preponderance of the "comparison" voltage, said timed means simultaneously opening said second signalling circuit.

30. The combination of claim 28 including means to transmit an intelligence character periodically at intervals which comprise a small fraction of the period during which the signalling circuit is closed by said timed means and means to energize said transmitting means by the closing of said signal circuit.

31. The combination of claim 29 including means to selectively transmit different intelligence characters each at intervals which comprise a submultiple of the period of closing of the signalling circuits by said timed means, means to energize said transmitting means to deliver a repetition of one character by the closing of said first signalling circuit and means to energize said transmitting means to deliver a repetition of a different character by the closing of the said second signalling circuit.

32. The combination of claim 31 including a teleprinter for receiving and visually recording said characters in a sequence, the relative number of the two characters designating the actual value of the variable as a percentage of a predetermined value at the instant the relay changes its condition.

33. An electric telemetering system including in combination, means establishing a voltage continuously representative of the value of a variable, means cyclically establishing a comparison voltage having a linearly increasing value for a portion of each time cycle, a comparison network receiving said voltages, a relay responsive to direction of unbalance of said network and arranged to open or close a signal circuit depending upon the direction of unbalance, and means under the control of said signal circuit arranged to transmit repeatedly an intelligence character during that part of the time portion that the signal circuit is closed.

ANTHONY J. HORNFECK.
JOHN F. LUHRS.
J. PEARSON SMITH.

References Cited in the file of this patent
UNITED STATES PATENTS

| Number | Name | Date |
|---|---|---|
| 1,496,101 | Schmitt | June 3, 1924 |
| 2,279,232 | Graham | Apr. 7, 1942 |
| 2,427,355 | Keinath | Sept. 16, 1947 |
| 2,444,202 | McAlpine et al. | June 29, 1948 |
| 2,524,665 | Hornfeck | Oct. 3, 1950 |
| 2,564,294 | Belcher, Jr. | Aug. 14, 1951 |
| 2,579,831 | Keinath | Dec. 25, 1951 |